United States Patent [19]

Marmonier et al.

[11] 4,056,441
[45] Nov. 1, 1977

[54] BRACING DEVICE FOR A BUNDLE OF PARALLEL PINS IN A NUCLEAR REACTOR ASSEMBLY

[75] Inventors: Pierre Marmonier, Aix-en-Provence, France; Bernard Mesnage, Madras, India; Jean Skok, Aix-en-Provence, France; Jean Vayra, Meyreuil, France

[73] Assignee: Commissariat a l'Energie Atomique, Paris, France

[21] Appl. No.: 650,031

[22] Filed: Jan. 19, 1976

[30] Foreign Application Priority Data

Jan. 20, 1975 France ............................. 75.01655

[51] Int. Cl.² .............................................. G21C 3/34
[52] U.S. Cl. ...................................... 176/78; 176/76; 298/68 R; 211/60 R
[58] Field of Search ............................ 176/76, 78, 79; 211/60 R; 248/68 R; 403/217

[56] References Cited

U.S. PATENT DOCUMENTS

| | | |
|---|---|---|
| 3,439,737 | 4/1969 | Boorman et al. ............... 176/76 X |
| 3,629,067 | 12/1971 | Demaison ............................ 176/78 |
| 3,764,471 | 10/1973 | Ripley ................................. 176/78 |
| 3,772,148 | 11/1973 | Seddon ................................ 176/78 |
| 3,816,247 | 6/1974 | Cayol et al. .......................... 176/78 |
| 3,886,038 | 5/1975 | Raven ............................. 176/81 X |
| 3,944,468 | 3/1976 | Duret et al. .......................... 176/81 |

FOREIGN PATENT DOCUMENTS

| | | |
|---|---|---|
| 1,497,083 | 6/1967 | France ................................ 176/76 |
| 1,306,939 | 2/1973 | United Kingdom ................ 176/78 |

Primary Examiner—Peter A. Nelson
Attorney, Agent, or Firm—Cameron, Kerkam, Sutton, Stowell & Stowell

[57] ABSTRACT

The device comprises at least one compartment grid formed by tube elements of small height placed in juxtaposed relation and each traversed axially by one pin of the bundle. The tube elements are rigidly fixed to each other at successive points in the grid and relatively displaced along the height of the pins so as to be distributed in at least one helix.

9 Claims, 9 Drawing Figures

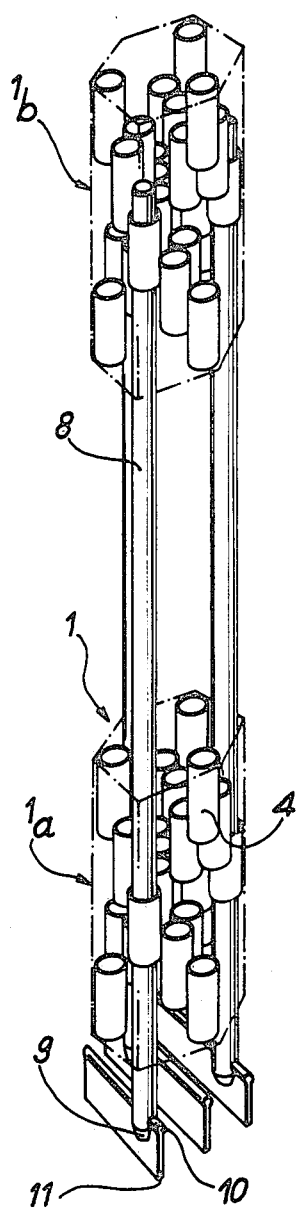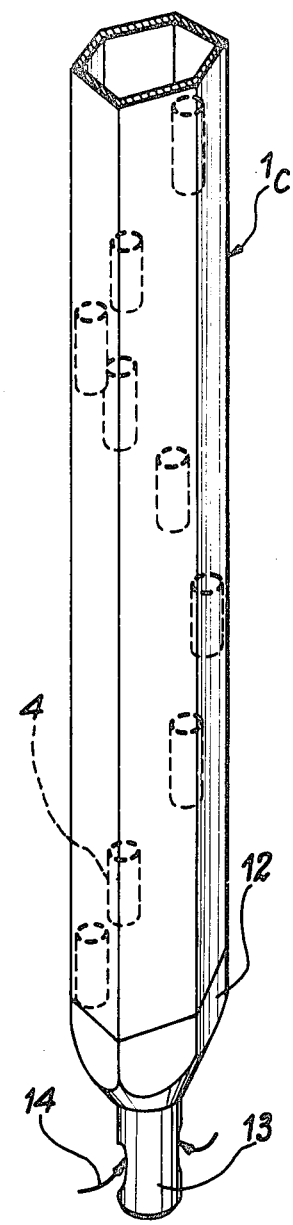
FIG. 4
FIG. 5

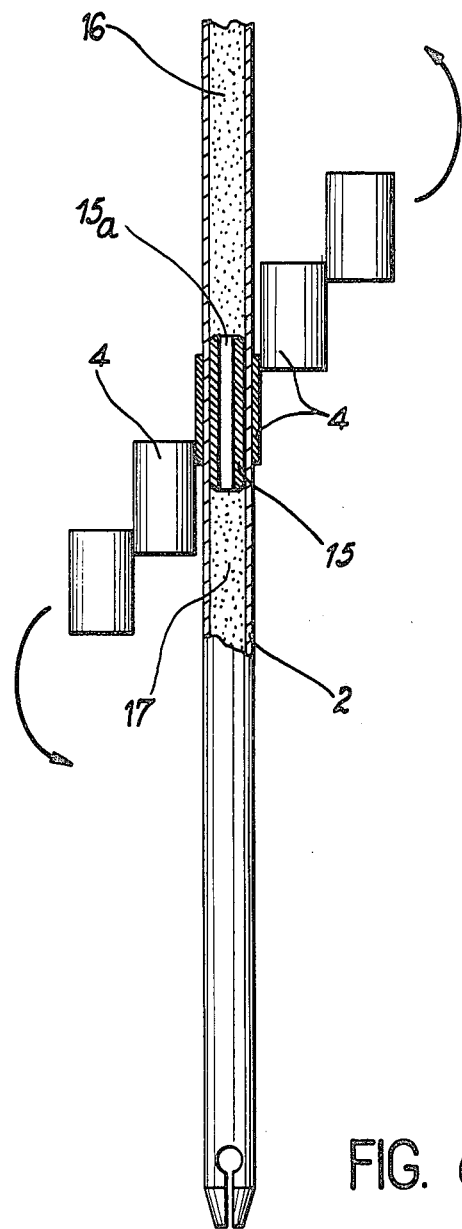
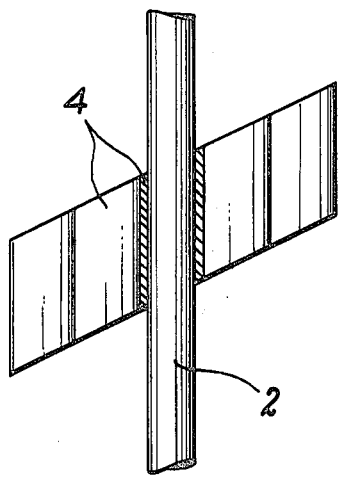
FIG. 6
FIG. 7

BRACING DEVICE FOR A BUNDLE OF PARALLEL PINS IN A NUCLEAR REACTOR ASSEMBLY

This invention relates to a device for bracing the parallel pins of a bundle mounted within an open-ended wrapper having a vertical axis and fitted at the lower end with a support member for said pins, thus forming a fuel assembly or fertile assembly for a nuclear reactor. Said pins are usually provided with a steel can and contain fuel material or fertile material or even both at the same time, in which case the material is distributed in superposed zones consisting in particular of a central fuel zone and two fertile zones located above and beneath the central zone. The assembly wrappers have a cross-section of polygonal shape which is usually hexagonal, the reactor core being formed in known manner by the juxtaposed arrangement of fuel assemblies of this type.

In each assembly wrapper, the bundle pitch adopted for the distribution of the fuel pins is maintained by spacer members which are placed between said pins and form passages for the circulation of a coolant fluid. Said spacer members must be designed in particular to prevent vibrations of the fuel pins while leaving a sufficient clearance between these latter without introducing an excessive pressure drop in the coolant flow. Moreover, said spacer members must permit differential swelling of the external wrapper of each fuel assembly and of the fuel-pin cans at high levels of radiation without impairing the integrity of said fuel pins. Finally, said spacer members must produce a suitable stirring action on the coolant fluid as it flows in contact with the fuel cans within the wrapper in order to obtain a substantially uniform temperature through the entire cross-section of the fuel assembly.

Among the known designs employed at the present time in the construction of spacer members, the most conventional consists in the use of a solid helical wire of steel which is welded to the ends of the can of each fuel pin, in particular onto the closure end-caps. However, this wire has a disadvantage in that it does not readily accommodate differential expansion of the fuel cans, especially in the fast power reactors which are at present under construction or under design in which neutron flux can attain very high values. In consequence, other solutions have already been proposed, especially in U.S. Pat. No. 3,944,468 bracing of the fuel pins being obtained in this case by means of a hollow tube into which is introduced with play a rigid core in the form of a wire so that partial flattening of said tube permits the above-mentioned differential swelling during operation. Finally, other more complex structural arrangements have been contemplated and entail the use of grids which are inclined to the axis of the fuel pins in the bundle and pierced with holes of elliptical shape for the insertion of the fuel pins, said grids being fabricated from successive plates joined together so as to form an open structure which permits the circulation of the coolant fluid. By way of indication, a structure of this type is described and claimed in particular in French Pat. No. 70 36995 of Oct. 13, 1970 in the name of Commissariat a l'Energie Atomique.

The present invention relates to another design of a device for bracing the parallel pins of a bundle which provides a large number of advantages over the known solutions by virtue of a very simple structure which wholly permits the effects of differential swelling of the fuel pins without introducing an excessive pressure drop in the coolant flow. This device offers a further advantage in that it ensures more effective stirring of the coolant fluid as it flows through each fuel assembly. Moreover, it permits only a very slight reduction in the volume percentage of fuel within the assembly.

To this end, the device under consideration essentially comprises at least one compartment grid formed by tube elements of small height placed in juxtaposed relation and each traversed axially by one pin of the fuel bundle, said tube elements being rigidly fixed to each other at successive points in the grid and relatively displaced along the height of said fuel pins so as to be distributed in at least one helix.

In a first alternative embodiment of the device under consideration, each tube element provides three generating lines of contact with the lateral surface of the can of the fuel pin which passes through said tube element and three other generating lines of contact with three adjacent tube elements in the grid.

In another alternative embodiment, each tube element has a cross-section in the shape of a regular hexagon provided internally on one side out of two with three small deformable lateral tongues in contact with the external surface of the can of the pin which passes through the tube element.

In accordance with a particular feature, the bracing device comprises a plurality of compartment grids which are superposed along the height of the fuel pins of the bundle. Depending on requirements, the compartment grids are joined together so as to form a single structure or else are located in spaced relation, the connection between the successive grids being provided by means of parallel longitudinal tie-rods which replace some of the pins of the bundle and on which are fixed the tube elements traversed by said tie-rods.

In another alternative embodiment, a certain number of tube elements of each compartment grid are welded to an intermediate plug provided at least at one predetermined level in some of the pins of the bundle.

Further characteristic features and advantages of a bracing device as constructed in accordance with the invention will become apparent from the following description of a number of exemplified embodiments which are given by way of indication without any limitation being implied, reference being made to the accompanying drawings, in which:

FIGS. 2a and 3a are partial views in perspective of two alternative forms of construction of a fuel pin and of a tube element which is traversed by said pin;

FIGS. 2b and 3b are partial cross-sectional views of the pin bundle and of the associated compartment grid which utilize the tube elements shown in FIGS. 2 and 3a;

FIGS. 4 and 5 are views to a smaller scale and in perspective showing two alternative forms of construction of the bracing device;

FIG. 6 is a partial detail view of another alternative form of construction of said device;

FIG. 7 illustrates an alternative form of construction of the device in accordance with FIG. 6.

Figure 1:
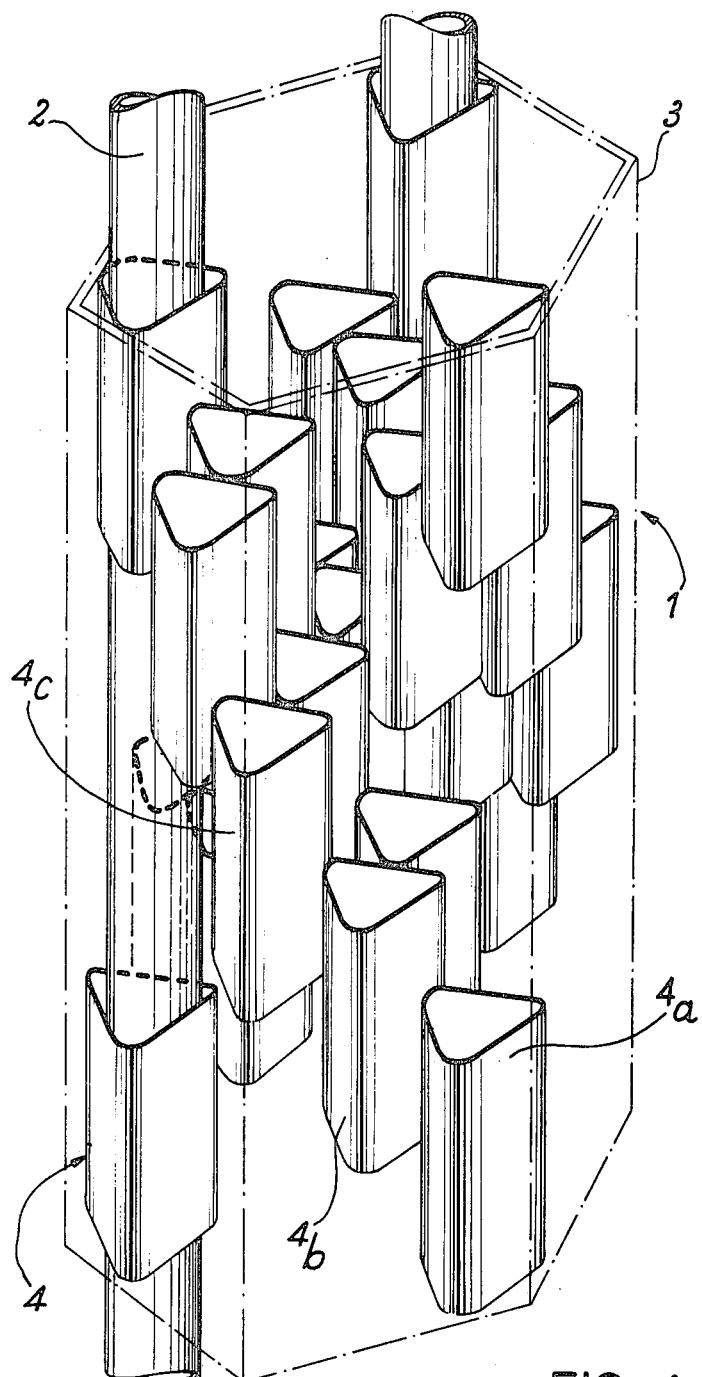
FIG. 1 is a diagrammatic view in perspective showing a compartment grid employed in the construction of the device under consideration.

In FIG. 1, the reference numeral 1 designates diagrammatically a compartment grid employed in the construction of a bracing device in accordance with the invention. In particular, said device is intended to ensure suitable spacing between the parallel pins of the bundle of a fuel assembly for a nuclear reactor and especially a fast reactor, said fuel pins being usually designed in the form of metallic cans 2 of substantial length and small cross-section containing fissile and/or fertile material.

In order to ensure safety of conditioning of the nuclear fuel within said cans, it is particularly desirable to ensure that these latter are braced within the fuel bundle without impairing their integrity and especially without any welding or brazing of external components on said cans. To this end and in accordance with the invention, the bracing device under consideration entails the use of at least one compartment grid as designated by the reference numeral 1 and formed within an external wrapper 3 of generally hexagonal shape in the example considered by hollow tube elements 4 in juxtaposed relation and distributed across the bundle of fuel assembly pins at axially displaced levels and corresponding to the elements 4a, 4b, 4c, etc.. as illustrated. Said tube elements are rigidly fixed to each other on their external surfaces and from one level to the next by means of spot welds, all these tube elements 4 being distributed within the wrapper 3 in at least one helix. Each fuel pin of the bundle passes through one tube element 4 and is centered within this latter.

Figures 2A, 2B:
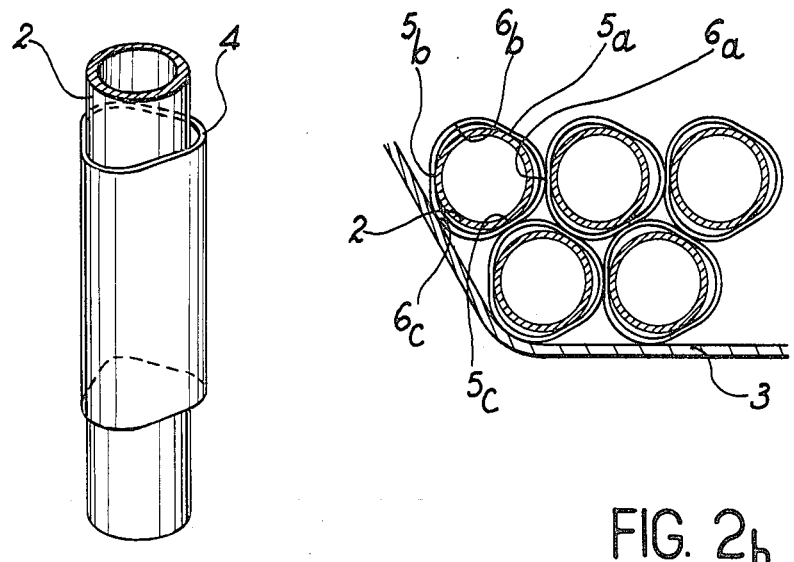

To this end and as illustrated in FIG. 2a in a first alternative embodiment, each tube element 4 is designed in the form of a deformable metallic sleeve, the cross-sectional profile of which is shown in FIG. 2b. Each tube element is so arranged as to have three generating lines 5a, 5b and 5c in contact with the external surface of the can 2 of the fuel pin which forms part of the bundle and passes through said tube element. Three other generating lines 6a, 6b and 6c are formed by said tube element in contact either with adjacent tube elements or with the internal surface of the wrapper 3, depending on the position of the element in the fuel-pin bundle.

This first alternative embodiment in which the tube elements 4 are deformable in the transverse direction has the advantage of readily permitting differential swelling of the fuel pins and of the wrapper under the action of radiation, especially at a high neutron flux level, while nevertheless maintaining a suitable spacing between the different fuel pins and a constant pitch of the lattice on which said pins are disposed within their bundles. In consequence, the efficiency of cooling by the coolant fluid which circulates within the wrapper 3 in contact with the cans 2 of the fuel pins is not disturbed. In addition, stirring or mixing of the fluid within the wrapper is improved at the same time by the helical arrangement of said tube elements.

Figures 3A, 3B:
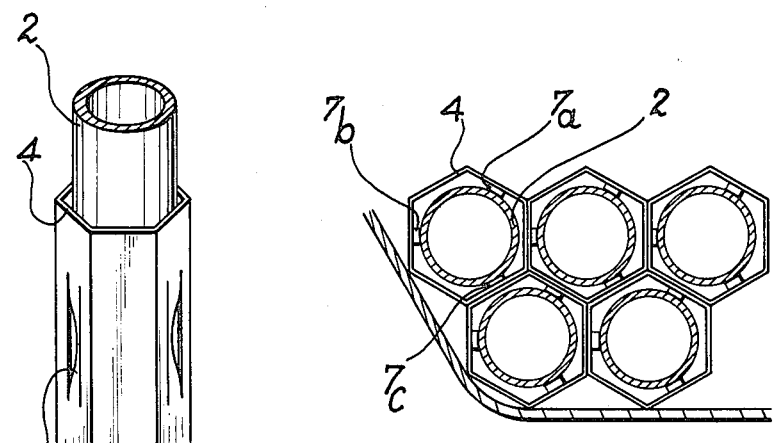

In the alternative embodiment which is illustrated in FIG. 3a, each tube element 4 has the cross-sectional shape of a regular hexagon and is provided in one side out of two with punched-out strips or added elements 7. As can be seen in FIG. 3b, these elements form three small tongues 7a, 7b and 7c in contact with the can 2 of the fuel pin which passes through the corresponding tube element while ensuring a contact with the adjacent elements in the grid. The flexibility of said small tongues is such that these latter are capable of accommodating the swelling of the fuel pins without difficulty. As in the previous alternative embodiment, the helical arrangement of the elements in the grid produces a stirring action on the coolant fluid and ensures uniformity of the temperatures within the fuel assembly.

Referring now to FIG. 4, it is apparent that the bundle of pins within the assembly can be maintained at the desired relative spacing by means of a plurality of compartment grids 1 of the type mentioned above, for example by means of two grids 1a or 1b disposed at the extremities of said bundle. In this case, the connection between said grids is provided by longitudinal tie-rods 8 which replace a certain number of fuel pins within the bundle. Said tie-rods are provided at their lower ends with split end-caps 9 which cooperate with rounded portions 10 provided at the upper extremities of rails 11. The connection may also be provided by means of any other arrangement which is employed in accordance with standard practice for supporting the fuel pins within an assembly wrapper.

In the alternative embodiment shown in FIG. 5, the bundle of pins has a single compartment grid 1c which extends to the full height of the fuel assembly. In this case, said grid 1c can be welded at its periphery to a component 12 which is provided at the lower end of the fuel assembly and extended by a positioning end-piece 13 into which the coolant fluid penetrates in the direction of the arrows 14 and circulates within said assembly.

Finally, in the alternative embodiment which is partially illustrated in FIG. 6, the tube elements 4 employed in the construction of each compartment grid can be rigidly fixed to a certain number of fuel pins of the bundle either by welding or by brazing of a certain number of said tube elements at the level of intermediate plugs 15 provided in the cans 2 of a number of pins. Each plug 15 is preferably provided with an axial bore 15a for the flow of fission gases and forms a separation in particular between two internal regions 16 and 17 which contain the fuel and fertile material.

By way of alternative, a single plug 15 can serve as a bearing point for a number of portions of grid of the type which is thus contemplated, said portions being distributed within the bundle of pins in a plurality of coaxial helices in much the same manner as helical blades. Moreover, the tube elements 4 can be constructed so as to have oblique end faces with respect to the direction of the axis of the fuel pins in accordance with another embodiment which is illustrated diagrammatically in FIG. 7.

In all cases, the bracing device under consideration in which compartment grids are employed offers the advantage of ensuring that the fuel pins of the bundle are maintained in spaced relation under conditions of reasonable dimensional requirements while preventing any vibration of the fuel pins but nevertheless allowing a sufficient clearance between them. The fuel assembly is mounted by inserting the fuel pins into the grids which are in turn inserted into the wrapper together with the fuel pins before being rigidly fixed to said wrapper in accordance with one of the alternative forms of construction described earlier. These constructional arrangements permit satisfactory circulation of the coolant fluid around each fuel pin with an acceptable pressure drop and above all do not in any way interfere with the differential swelling process. Finally, stirring of the coolant fluid is particularly efficient, thereby limiting variations in temperature in the different regions of the bundle.

It must be clearly understood that the invention is not limited in any sense to the examples of construction which have been more particularly described with reference to the accompanying drawings but is intended on the contrary to include all alternative forms. In particular, apart from the application to a fuel or fertile assembly as contemplated in the foregoing, the invention could also be utilized with a control assembly consisting of a bundle of pins containing neutron-absorbing material and placed within a wrapper which is similar in design to those of the fuel assemblies of the reactor core.

What we claim is:

1. A bracing device for a bundle of parallel pins in nuclear reactor assembly, comprising at least one compartment grid formed by multisided cylinder elements of small height placed in juxtaposed relation and each traversed axially by one pin of the bundle, said elements being rigidly fixed to each other at successive points in the grid, wherein said elements are displaced along the height of said pins so as to be distributed in at least one helix.

2. A bracing device according to claim 1, wherein each element provides three lines of contact with the lateral surface of the can of the pin which passes through said tube element and three other lines of contact with three adjacent elements in the grid.

3. A bracing device according to claim 1, wherein each element has a cross-section in the shape of a regular hexagon provided internally on one side out of two with a small deformable lateral tongue in contact with the external surface of the can of the pin which passes through said tube element.

4. A bracing device according to claim 1, wherein said device comprises a plurality of compartment grids which are superposed along the height of the pins of the bundle.

5. A bracing device according to claim 4, wherein the compartment grids are joined together so as to form a single structure.

6. A bracing device according to claim 4, wherein the compartment grids are disposed in spaced relation, the connection between the successive grids being provided by means of parallel longitudinal tie-rods which replace some of the pins of the bundle and on which are fixed the elements traversed by said tie-rods.

7. A bracing device according to claim 4, wherein a certain number of elements of each compartment grid are welded to an intermediate plug provided at least at one predetermined level in some of the pins of the bundle.

8. A bracing device according to claim 7, wherein an intermediate plug serves as a bearing point for a number of portions of grids which extend in coaxial helices.

9. A bracing device according to claim 7, wherein said elements have top and bottom surfaces at an oblique angle with respect to the direction of the axis of the pins of the bundle.

* * * * *